(12) United States Patent
Yang et al.

(10) Patent No.: US 7,411,764 B2
(45) Date of Patent: Aug. 12, 2008

(54) HEAD GIMBAL ASSEMBLY WITH PRECISE POSITIONING ACTUATOR FOR READ/WRITE HEAD AND DISK DRIVE DEVICE WITH THE HEAD GIMBAL ASSEMBLY

(75) Inventors: Huai Yang, DongGuan (CN); HaiMing Zhou, HongKong (CN)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 334 days.

(21) Appl. No.: 11/238,998

(22) Filed: Sep. 30, 2005

(65) Prior Publication Data

US 2007/0076327 A1    Apr. 5, 2007

(51) Int. Cl.
*G11B 21/10* (2006.01)
*G11B 5/596* (2006.01)

(52) U.S. Cl. .................................. 360/294.4
(58) Field of Classification Search ............. 360/294.4
See application file for complete search history.

(56) References Cited

U.S. PATENT DOCUMENTS

| | | | |
|---|---|---|---|
| 5,299,081 A | 3/1994 | Hatch et al. | |
| 5,611,707 A | 3/1997 | Meynier | |
| 5,636,089 A | 6/1997 | Jurgenson et al. | |
| 5,898,544 A | 4/1999 | Krinke et al. | |
| 6,198,606 B1 | 3/2001 | Boutaghou et al. | |
| 6,538,836 B1 | 3/2003 | Dunfield et al. | |
| 6,617,763 B2 | 9/2003 | Mita et al. | |
| 6,624,984 B2 | 9/2003 | Lewis et al. | |
| 6,671,131 B2 | 12/2003 | Kasajima et al. | |
| 6,700,727 B1 | 3/2004 | Crane et al. | |
| 6,831,815 B2 * | 12/2004 | Kasajima et al. | 360/294.4 |
| 6,934,127 B2 * | 8/2005 | Yao et al. | 360/294.4 |
| 6,950,266 B1 | 9/2005 | McCaslin et al. | |
| 6,950,288 B2 * | 9/2005 | Yao et al. | 360/294.4 |
| 7,046,486 B1 * | 5/2006 | Coffey | 360/294.4 |
| 7,051,424 B2 * | 5/2006 | Yao et al. | 29/603.06 |
| 2002/0154450 A1 * | 10/2002 | Kasajima et al. | 360/294.4 |

(Continued)

FOREIGN PATENT DOCUMENTS

JP    2002-74871    3/2002

(Continued)

OTHER PUBLICATIONS

U.S. Appl. No. 11/169,019, filed Jun. 2005, Yao et al.

(Continued)

*Primary Examiner*—William J Klimowicz
(74) *Attorney, Agent, or Firm*—Nixon & Vanderhye P.C.

(57) ABSTRACT

A micro-actuator for a head gimbal assembly includes a fixed portion connectable to a suspension of the head gimbal assembly and a movable portion connectable to a slider of the head gimbal assembly. A pair of frame ribs interconnect the fixed portion and the movable portion. A PZT element is mounted to each of the frame ribs. Each PZT element is excitable to cause selective movement of the frame ribs which causes movement of the movable portion to cause movement of the slider. A tongue is fixed to and extends from the fixed portion. The tongue is engagable with a pivot provided on the suspension of the head gimbal assembly. The tongue forms a gap between the movable portion and itself.

18 Claims, 15 Drawing Sheets

U.S. PATENT DOCUMENTS

| | | | |
|---|---|---|---|
| 2003/0147177 | A1 | 8/2003 | Yao et al. |
| 2003/0147181 | A1 | 8/2003 | Shiraishi et al. |
| 2003/0168935 | A1 | 9/2003 | Ogawa et al. |
| 2004/0145834 | A1* | 7/2004 | Miyano et al. ........... 360/294.4 |
| 2004/0250413 | A1* | 12/2004 | Yao et al. .................. 29/603.03 |
| 2005/0174699 | A1* | 8/2005 | Yao et al. .................. 360/294.4 |
| 2005/0286176 | A1* | 12/2005 | Yao et al. .................. 360/294.4 |
| 2006/0023338 | A1 | 2/2006 | Sharma et al. |
| 2006/0050442 | A1 | 3/2006 | Yao et al. |
| 2006/0072247 | A1 | 4/2006 | Yao et al. |
| 2006/0082917 | A1 | 4/2006 | Yao et al. |
| 2006/0098347 | A1* | 5/2006 | Yao et al. .................. 360/294.4 |
| 2006/0146449 | A1 | 7/2006 | Yao et al. |
| 2006/0193087 | A1* | 8/2006 | Yao et al. .................. 360/294.4 |
| 2007/0002500 | A1* | 1/2007 | Yao et al. .................. 360/294.4 |
| 2007/0064347 | A1* | 3/2007 | Honda ..................... 360/294.4 |

FOREIGN PATENT DOCUMENTS

| | | |
|---|---|---|
| JP | 2002-133803 | 5/2002 |

OTHER PUBLICATIONS

U.S. Appl. No. 11/080,659, filed Mar. 2005, Yao et al.
U.S. Appl. No. 11/050,823, filed Jan. 2005, Yao et al.
U.S. Appl. No. 11/080,657, filed Mar. 2005, Zhu et al.
U.S. Appl. No. 11/235,549, filed Sep. 2005, Yao et al.
U.S. Appl. No. 11/304,623, filed Dec. 2005, Yao et al.
U.S. Appl. No. 11/169,003, filed Jun. 2005, Yao et al.
U.S. Appl. No. 11/125,248, filed May. 2005, Yao et al.
U.S. Appl. No. 11/263,998, filed Nov. 2005, Yao
U.S. Appl. No. 11/265,385, filed Nov. 2005, Yao et al.
U.S. Appl. No. 11/192,121, filed Jul. 2005, Yao et al.
U.S. Appl. No. 11/304,544, filed Dec. 2005, Yao
U.S. Appl. No. 11/300,339, filed Dec. 2005, Yao
U.S. Appl. No. 11/385,704, filed Mar. 2006, Yao et al.
U.S. Appl. No. 11/385,698, filed Mar. 2006, Yao et al.
U.S. Appl. No. 11/319,577, filed Dec. 2005, Yao et al.
U.S. Appl. No. 11/353,018, filed Feb. 2006, Yao
U.S. Appl. No. 11/273,075, filed Nov. 2005, Yao
U.S. Appl. No. 11/319,580, filed Dec. 2005, Yao et al.
U.S. Appl. No. 11/384,404, filed Mar. 2006, Yao
U.S. Appl. No. 11/414,546, filed May. 2006, Yao et al.
U.S. Appl. No. 11/440,354, filed May. 2006, Li \* cited by examiner

HEAD GIMBAL ASSEMBLY WITH PRECISE POSITIONING ACTUATOR FOR READ/WRITE HEAD AND DISK DRIVE DEVICE WITH THE HEAD GIMBAL ASSEMBLY

FIELD OF THE INVENTION

The present invention relates to information recording disk drive devices and, more particularly, to a head gimbal assembly (HGA) with a precise positioning actuator for a read/write head such as a thin-film magnetic head element for magnetic recording.

BACKGROUND OF THE INVENTION

One known type of information storage device is a disk drive device that uses magnetic media to store data and a movable read/write head that is positioned over the media to selectively read from or write to the disk.

Consumers are constantly desiring greater storage capacity for such disk drive devices, as well as faster and more accurate reading and writing operations. Thus, disk drive manufacturers have continued to develop higher capacity disk drives by, for example, increasing the density of the information tracks on the disks by using a narrower track width and/or a narrower track pitch. However, each increase in track density requires that the disk drive device have a corresponding increase in the positional control of the read/write head in order to enable quick and accurate reading and writing operations using the higher density disks. As track density increases, it becomes more and more difficult using known technology to quickly and accurately position the read/write head over the desired information tracks on the storage media. Thus, disk drive manufacturers are constantly seeking ways to improve the positional control of the read/write head in order to take advantage of the continual increases in track density.

One approach that has been effectively used by disk drive manufacturers to improve the positional control of read/write heads for higher density disks is to employ a secondary actuator, known as a micro-actuator, that works in conjunction with a primary actuator to enable quick and accurate positional control for the read/write head. Disk drives that incorporate a micro-actuator are known as dual-stage actuator systems.

Various dual-stage actuator systems have been developed in the past for the purpose of increasing the access speed and fine tuning the position of the read/write head over the desired tracks on high density storage media. Such dual-stage actuator systems typically include a primary voice-coil motor (VCM) actuator and a secondary micro-actuator, such as a PZT element micro-actuator. The VCM actuator is controlled by a servo control system that rotates the actuator arm that supports the read/write head to position the read/write head over the desired information track on the storage media. The PZT element micro-actuator is used in conjunction with the VCM actuator for the purpose of increasing the positioning access speed and fine tuning the exact position of the read/write head over the desired track. Thus, the VCM actuator makes larger adjustments to the position of the read/write head, while the PZT element micro-actuator makes smaller adjustments that fine tune the position of the read/write head relative to the storage media. In conjunction, the VCM actuator and the PZT element micro-actuator enable information to be efficiently and accurately written to and read from high density storage media.

One known type of micro-actuator incorporates PZT elements for causing fine positional adjustments of the read/write head. Such PZT micro-actuators include associated electronics that are operable to excite the PZT elements on the micro-actuator to selectively cause expansion or contraction thereof. The PZT micro-actuator is configured such that expansion or contraction of the PZT elements causes movement of the micro-actuator which, in turn, causes movement of the read/write head. This movement is used to make faster and finer adjustments to the position of the read/write head, as compared to a disk drive device that uses only a VCM actuator. Exemplary PZT micro-actuators are disclosed in, for example, JP 2002-133803, entitled "Very Small Positioning Actuator For Head Element, Head Gimbal Assembly Equipped With The Actuator, Disk Device Equipped With The Head Gimbal Assembly, Actuator Manufacturing Method, And Head Gimbal Assembly Manufacturing Method" and JP 2002-074871, entitled "Head Gimbals Assembly Equipped with Actuator for Fine Position, Disk Drive Equipped with Head Gimbals Assembly, and Manufacture Method for Head Gimbal Assembly."

FIGS. 1a and 1b illustrate a conventional disk drive device and show a magnetic disk 101 mounted on a spindle motor 102 for spinning the disk 101. A voice coil motor arm 104 carries a head gimbal assembly (HGA) 100 that includes a micro-actuator 105 with a slider 103 incorporating a read/write head, such as a thin-film magnetic head element for magnetic recording. A voice-coil motor (VCM) 115 is provided for controlling the motion of the motor arm 104 and, in turn, controlling the slider 103 to move from track to track across the surface of the disk 101, thereby enabling the read/write head to read data from or write data to the disk 101. In operation, a lift force is generated by the aerodynamic interaction between the slider 103, incorporating the read/write head, and the spinning magnetic disk 101. The lift force is opposed by equal and opposite spring forces applied by a suspension of the HGA 100 such that a predetermined flying height above the surface of the spinning disk 101 is maintained over a full radial stroke of the motor arm 104.

The head gimbal assembly (HGA) 100 of the conventional disk drive device of FIGS. 1a-1b incorporates a dual-stage actuator. However, because of the inherent tolerances of the VCM and the head suspension assembly, the slider 103 cannot achieve quick and fine position control which adversely impacts the ability of the read/write head to accurately read data from and write data to the disk. As a result, a PZT micro-actuator 105, as described above, is provided in order to improve the positional control of the slider and the read/write head. More particularly, the PZT micro-actuator 105 corrects the displacement of the slider 103 on a much smaller scale, as compared to the VCM, in order to compensate for the manufacturing tolerance of the VCM and/or head suspension assembly. The micro-actuator 105 enables, for example, the use of a smaller recording track pitch, and can increase the "tracks-per-inch" (TPI) value by 50% for the disk drive device, as well as provide an advantageous reduction in the head seeking and settling time. Thus, the PZT micro-actuator 105 enables the disk drive device to have a significant increase in the surface recording density of the information storage disks used therein.

U.S. Patent Application Publication Nos. US 2003/0147177 and US 2003/0147181 disclose one type of micro-actuator. This micro-actuator is U-shaped and has two side arms that hold the slider therebetween and displace the slider by movement of the side arms. In order not to interfere with movement of the slider, the micro-actuator is assembled to the suspension such that a gap is maintained between the slider and the suspension gimbal tongue. However, providing such a gap decreases shock resistance. Moreover, it is difficult to precisely maintain the gap constant. In addition, the microactuator configuration causes the suspension to be more complicated because the suspension has to be divided into two separated parts, i.e., one part attached with a fixed portion of the micro-actuator and another part attached with a movable portion of the micro-actuator.

Thus, there is a need for an improved micro-actuator for use in head gimbal assemblies and disk drive devices that does not suffer from the above-mentioned disadvantages, yet still enables fine tuning of the read/write head.

SUMMARY OF THE INVENTION

One aspect of the present invention relates to an improved micro-actuator and head gimbal assembly that provides fine head position adjustments and improved performance characteristics.

Another aspect of the present invention relates to a disk drive device with fine head position adjustment using a micro-actuator.

Another aspect of the present invention relates to a micro-actuator that has improved mechanical shock performance.

Another aspect of the invention relates to a micro-actuator for a head gimbal assembly. The micro-actuator includes a fixed portion connectable to a suspension of the head gimbal assembly and a movable portion connectable to a slider of the head gimbal assembly. A pair of frame ribs interconnect the fixed portion and the movable portion. A PZT element is mounted to each of the frame ribs. Each PZT element is excitable to cause selective movement of the frame ribs which causes movement of the movable portion to cause movement of the slider. A tongue is fixed to and extends from the fixed portion. The tongue is engagable with a pivot provided on the suspension of the head gimbal assembly. The tongue forms a gap between the movable portion and itself.

Still another aspect of the invention relates to a head gimbal assembly. The head gimbal assembly includes a micro-actuator, a slider, and a suspension that supports the micro-actuator and slider. The micro-actuator includes a fixed portion connected to the suspension, a movable portion connected to the slider, and a pair of frame ribs that interconnect the fixed portion and the movable portion. A PZT element is mounted to each of the frame ribs. Each PZT element is excitable to cause selective movement of the frame ribs which causes movement of the movable portion to cause movement of the slider. A tongue is fixed to and extends from the fixed portion. The tongue engages with a pivot provided on the suspension. The tongue forms a gap between the movable portion and itself.

Yet another aspect of the invention relates to a disk drive device. The disk drive device includes a head gimbal assembly, a drive arm connected to the head gimbal assembly, a disk, and a spindle motor operable to spin the disk. The head gimbal assembly includes a micro-actuator, a slider, and a suspension that supports the micro-actuator and slider. The micro-actuator includes a fixed portion connected to the suspension, a movable portion connected to the slider, and a pair of frame ribs that interconnect the fixed portion and the movable portion. A PZT element is mounted to each of the frame ribs. Each PZT element is excitable to cause selective movement of the frame ribs which causes movement of the movable portion to cause movement of the slider. A tongue is fixed to and extends from the fixed portion. The tongue engages with a pivot provided on the suspension. The tongue forms a gap between the movable portion and itself.

Other aspects, features, and advantages of this invention will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate an understanding of the various embodiments of this invention. In such drawings:

FIG. 1b is a partial perspective view of the conventional disk drive device shown in FIG. 1a;

DETAILED DESCRIPTION OF ILLUSTRATED EMBODIMENTS

Figure 1A:
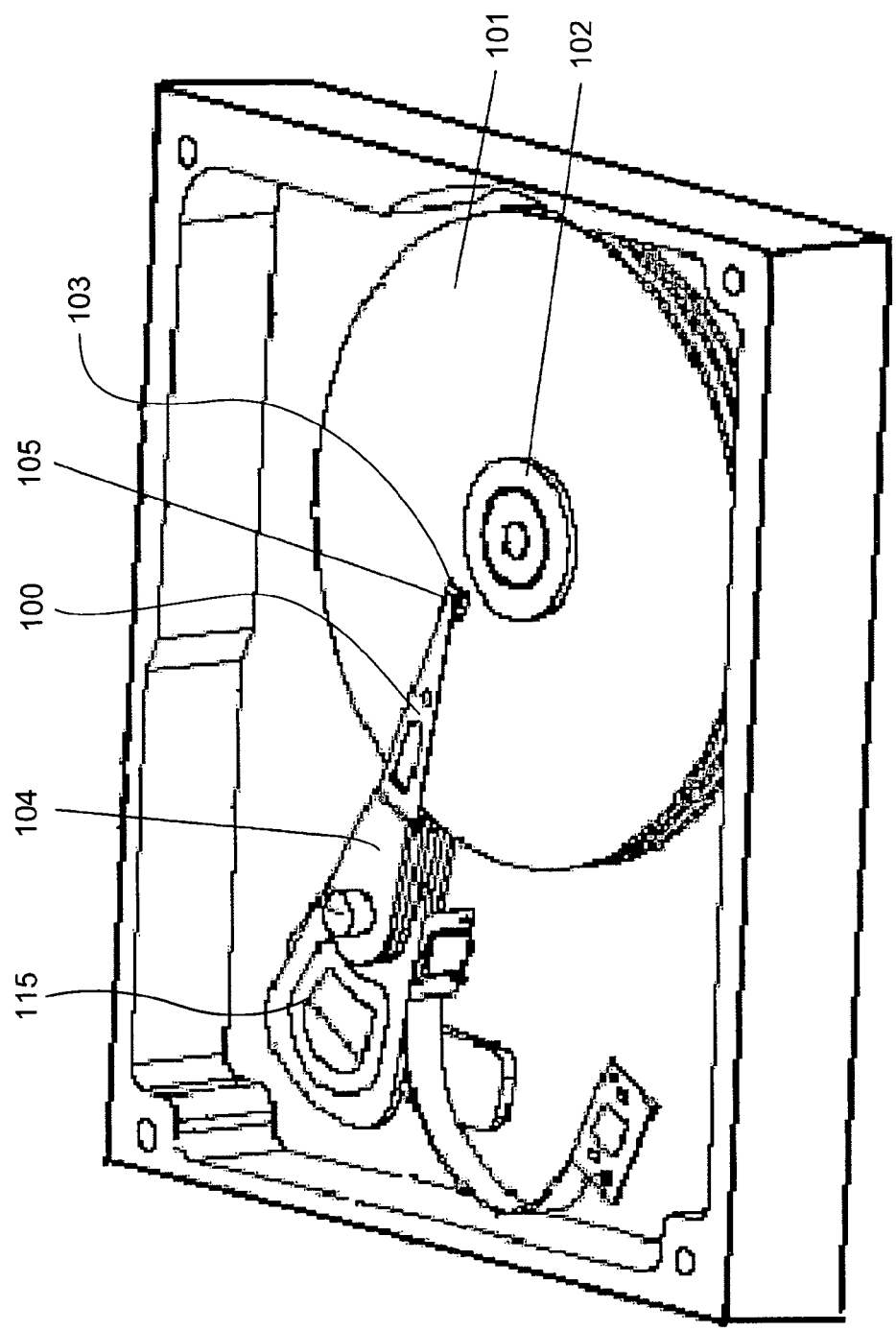
FIG. 1a is a perspective view of a conventional disk drive device.
Figure 1B:
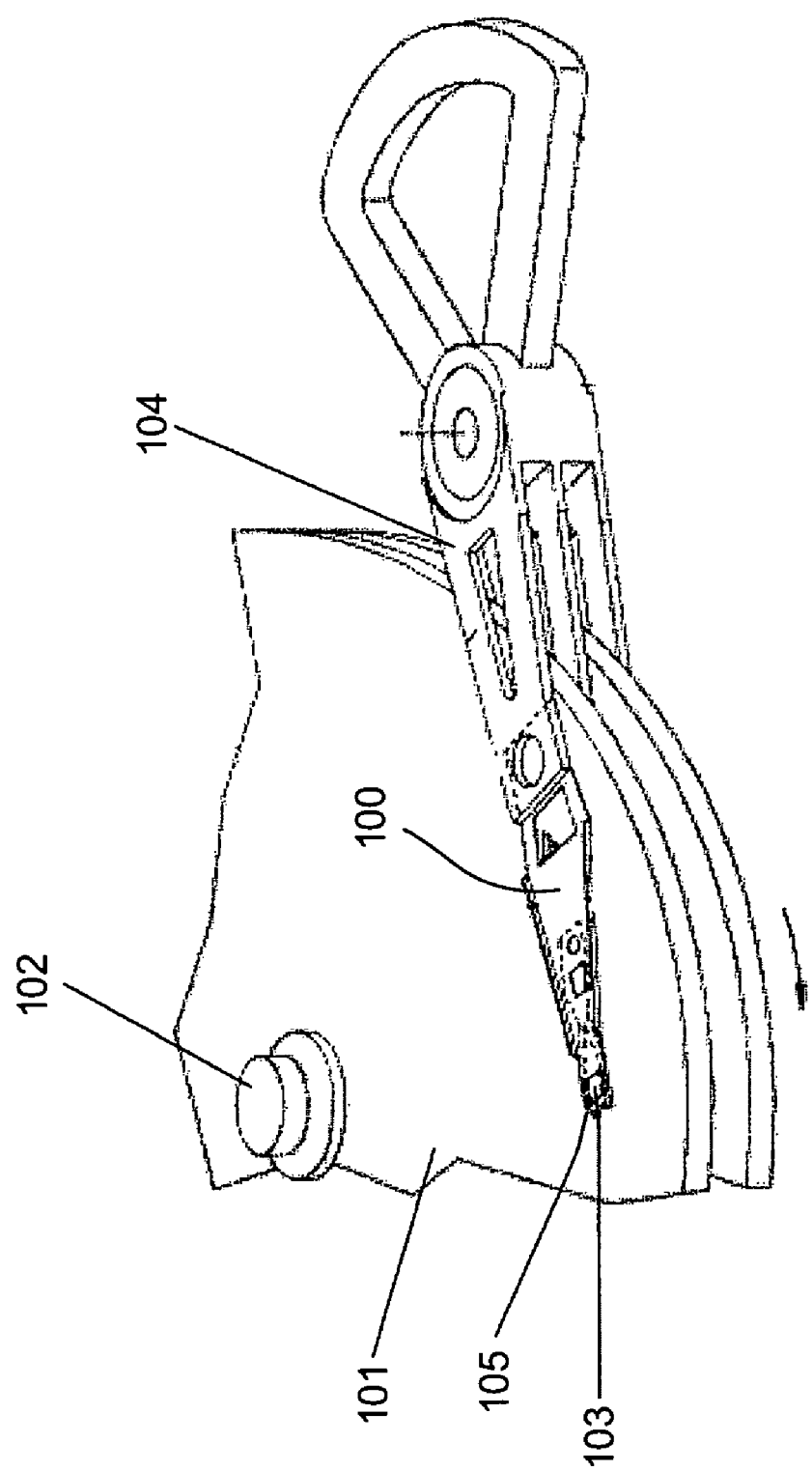

Various preferred embodiments of the instant invention will now be described with reference to the figures, wherein like reference numerals designate similar parts throughout the various views. As indicated above, the instant invention is designed to precisely actuate the slider using the micro-actuator. An aspect of the instant invention is to provide a micro-actuator that includes a tongue configured to engage a pivot of the HGA suspension.

Several example embodiments of a micro-actuator for a HGA will now be described. It is noted that the micro-actuator may be implemented in any suitable disk drive device having a micro-actuator, regardless of the specific structure of the HGA as illustrated in the figures. That is, the invention may be used in any suitable device having a micro-actuator in any industry.

Figure 2:
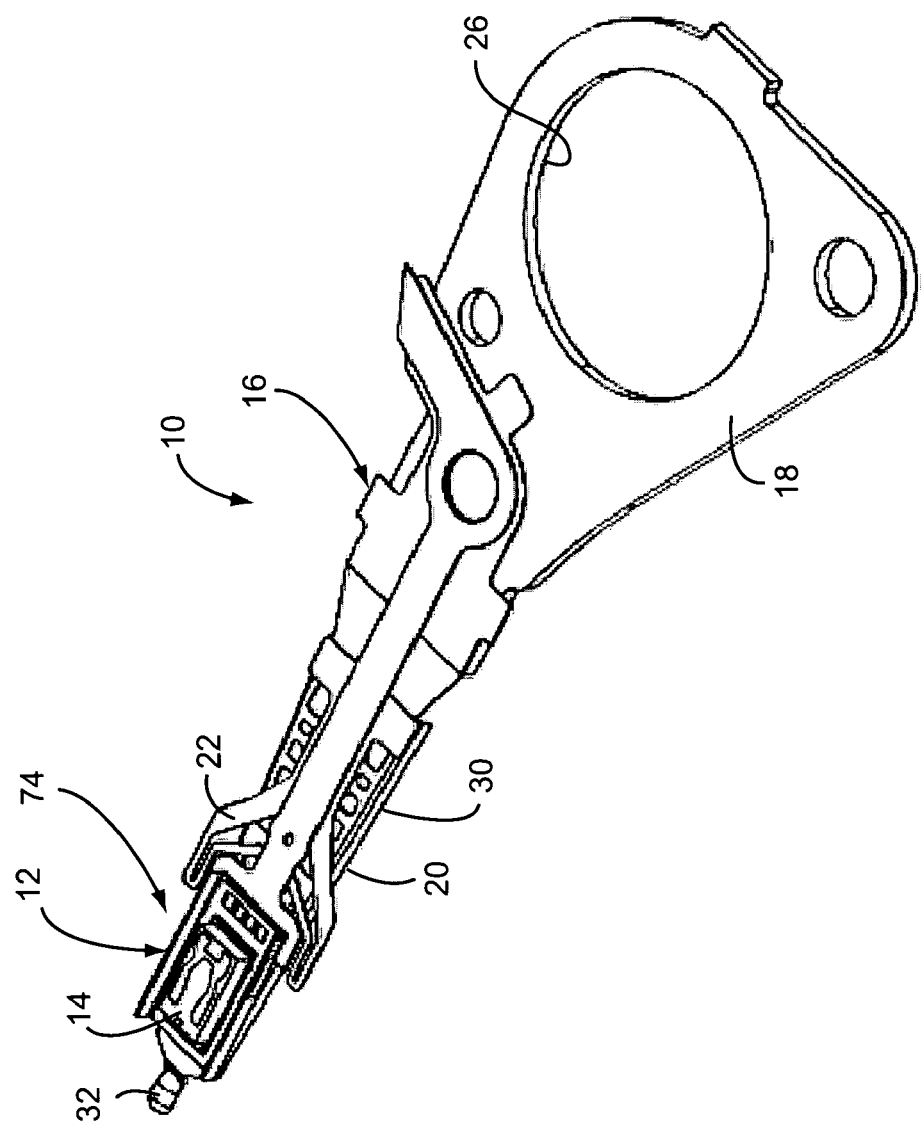
FIG. 2 is a perspective view of a head gimbal assembly (HGA) including a PZT micro-actuator according to an embodiment of the present invention.
Figure 3:
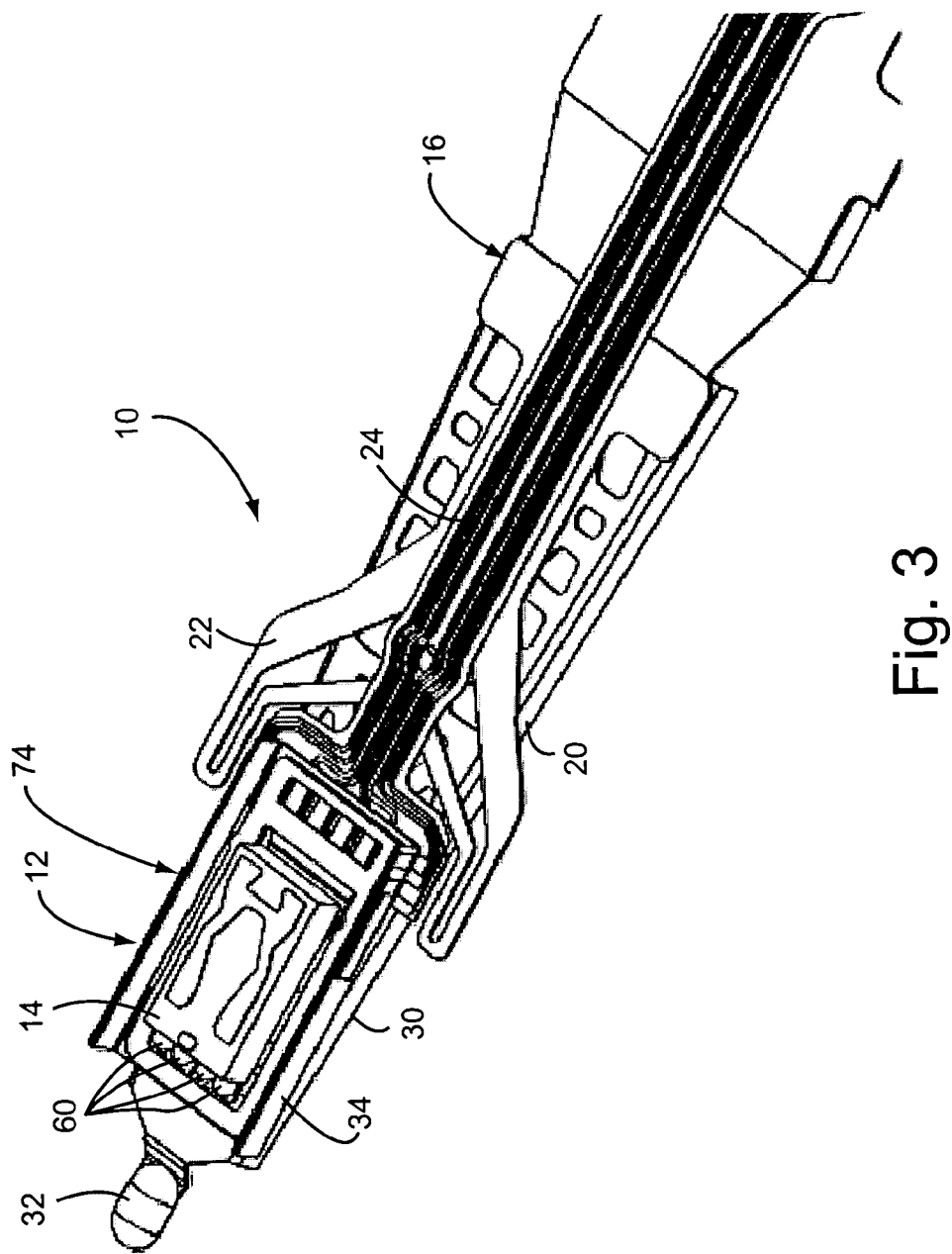
FIG. 3 is an enlarged, partial perspective view of the HGA shown in FIG. 2.

FIGS. 2 and 3 illustrate a head gimbal assembly (HGA) 10 incorporating a PZT micro-actuator 12 according to a first exemplary embodiment of the present invention. The HGA 10 includes a PZT micro-actuator 12, a slider 14, and a suspension 16 to load or suspend the PZT micro-actuator 12 and the slider 14.

The suspension 16 includes a base plate 18, a load beam 20, a flexure 22, and a suspension trace 24. The base plate 18 includes a mounting hole 26 for use in connecting the suspension 16 to a drive arm of a voice coil motor (VCM) of a disk drive device. The shape of the base plate 18 may vary depending on the configuration or model of the disk drive device. Also, the base plate 18 is constructed of a relatively hard or rigid material, e.g., metal, to stably support the suspension 16 on the drive arm of the VCM.

Figure 4:
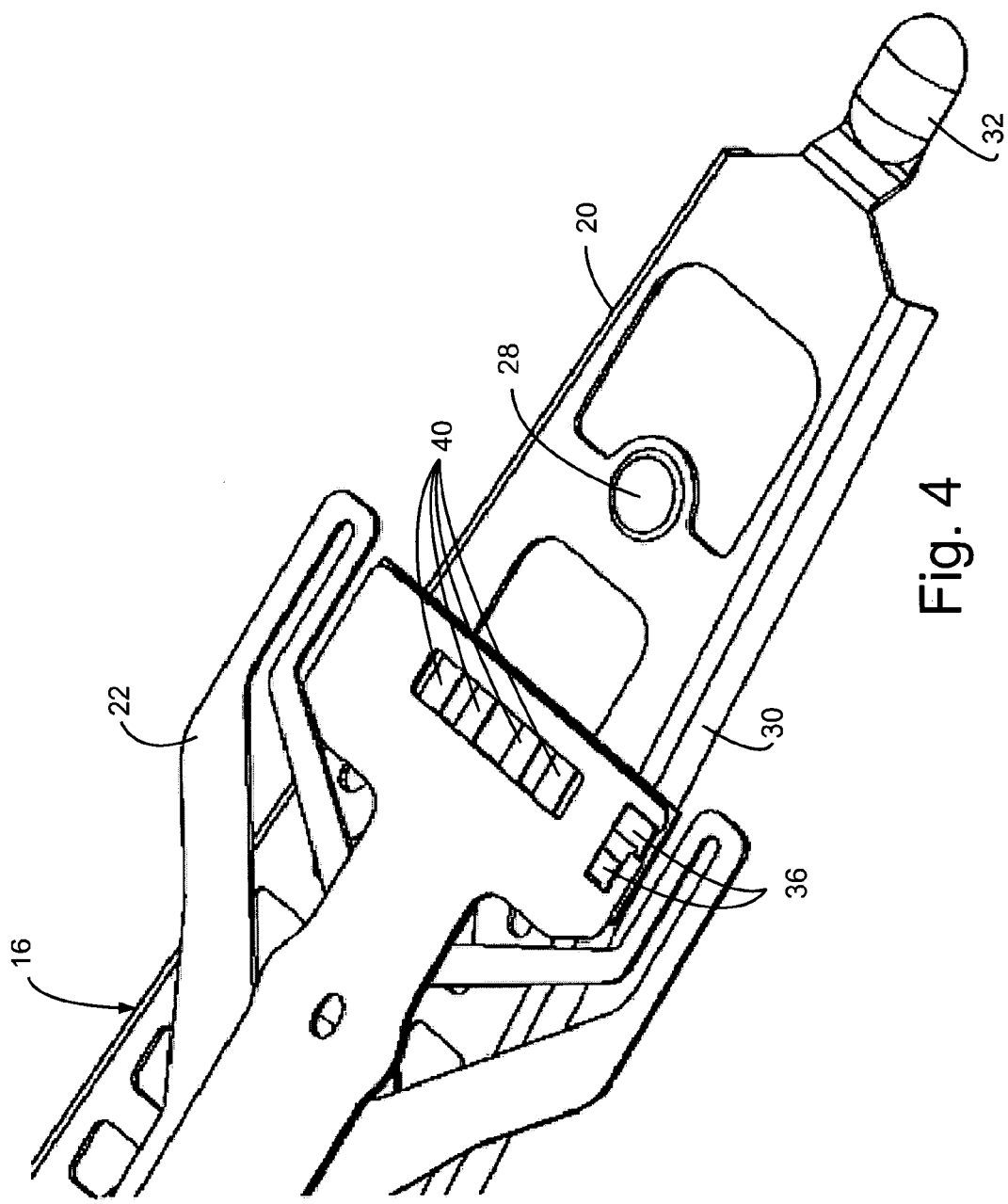
FIG. 4 is an enlarged, partial perspective view of the suspension of the HGA shown in FIG. 2 with the PZT micro-actuator and slider removed.

As best shown in FIG. 4, the load beam 20 is mounted onto the base plate 18, e.g., by laser. The load beam 20 has a pivot 28 in the form of a dimple formed thereon. The load beam 20 functions as a rigid body. The load beam 20 has a plate-like configuration with suspension ribs 30 on both sides. The suspension ribs 30 are provided to increase the flexural strength or rigidity of the load beam 20 so the load beam 20 does not deform (e.g., see U.S. Pat. No. 5,870,256 as a reference). Also, an optional lift tab 32 may be provided on the load beam 20 to lift the HGA 10 from the disk when the disk is not rotated.

The flexure 22 is mounted to the load beam 20, e.g., by laser or adhesive. The flexure 22 is provided to couple the PZT micro-actuator 12 to the suspension 16, i.e., the load beam 20. The flexure 22 is flexible in multiple directions such as roll and pitch.

The suspension trace 24 is provided on the flexure 22 to electrically connect a plurality of connection pads (which connect to an external control system) with the slider 14 and the PZT elements 34 on the PZT micro-actuator 12. In the illustrated embodiment, the suspension trace 24 includes six lines. However, the suspension trace 24 may include any other suitable number of lines. The suspension trace 24 may be a flexible printed circuit (FPC) and may be a part of the flexure 22, e.g., made by laminated material like CIS, TSA or ILS, FSA is FPC and flexure (e.g., stainless steel).

As best shown in FIGS. 3 and 4, pads 36 are directly connected to the suspension trace 24 to electrically connect the suspension trace 24 with pads 38 (see FIG. 5) coupled to the PZT elements 34 of the PZT micro-actuator 12. Also, pads 40 are directly connected to the suspension trace 24 to electrically connect the suspension trace 24 with pads 41 (see FIG. 5) provided on the frame of the PZT micro-actuator 12, which is electrically connected to the slider 14.

A voice-coil motor (VCM) is provided in the disk drive device for controllably driving the drive arm and, in turn, the HGA 10 in order to enable the HGA 10 to position the slider 14, and associated read/write head, over any desired information track on a disk in the disk drive device. The PZT micro-actuator 12 is provided to enable faster and finer positional control for the device, as well as to reduce the head seeking and settling time during operation. Thus, when the HGA 10 is incorporated into a disk drive device, a dual-stage actuator system is provided in which the VCM actuator provides large positional adjustments and the PZT micro-actuator 12 provides fine positional adjustments for the read/write head.

Figure 7:
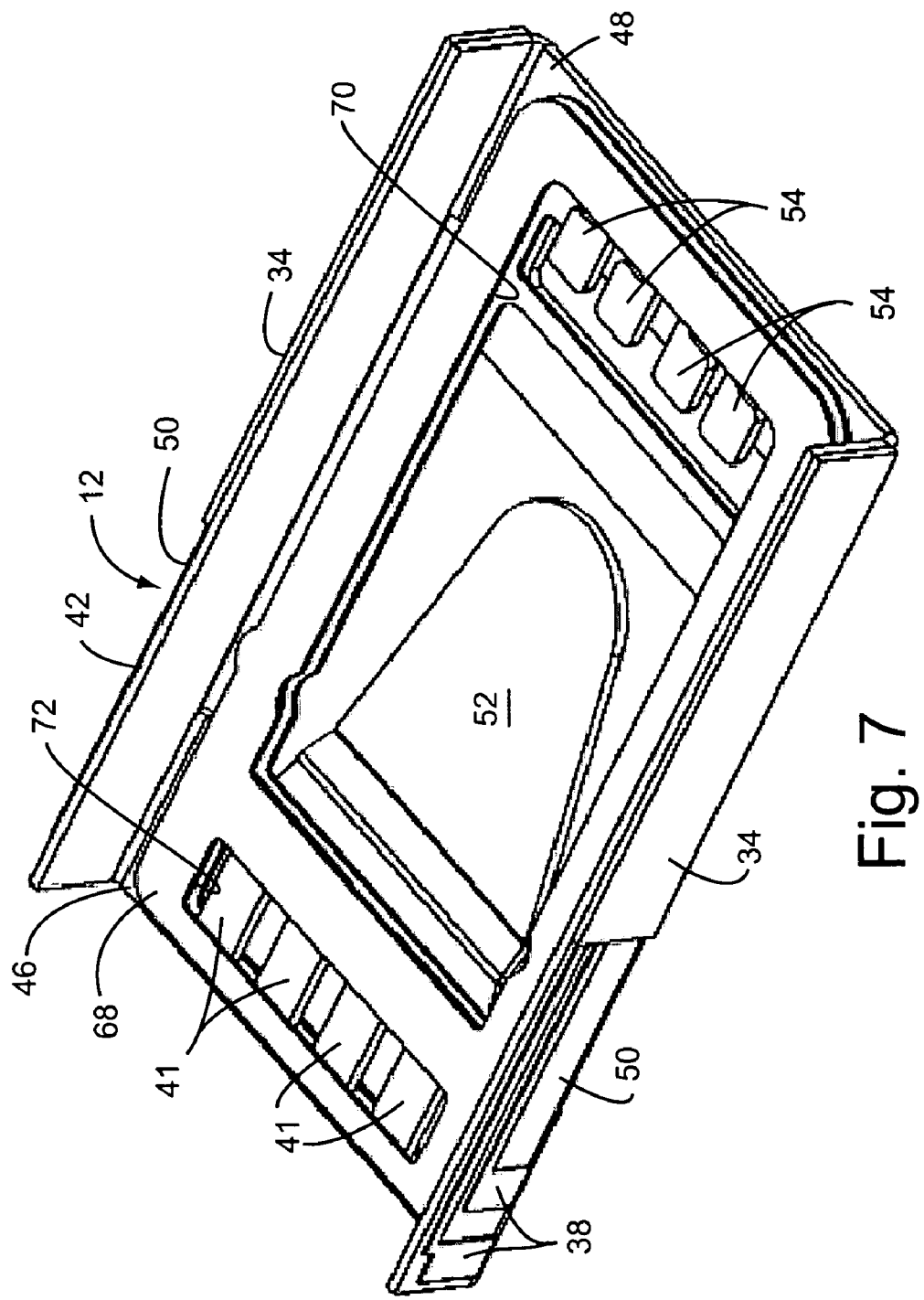
FIG. 7 is an isolated top perspective view of the PZT micro-actuator shown in FIG. 2 without the slider.
Figure 8:
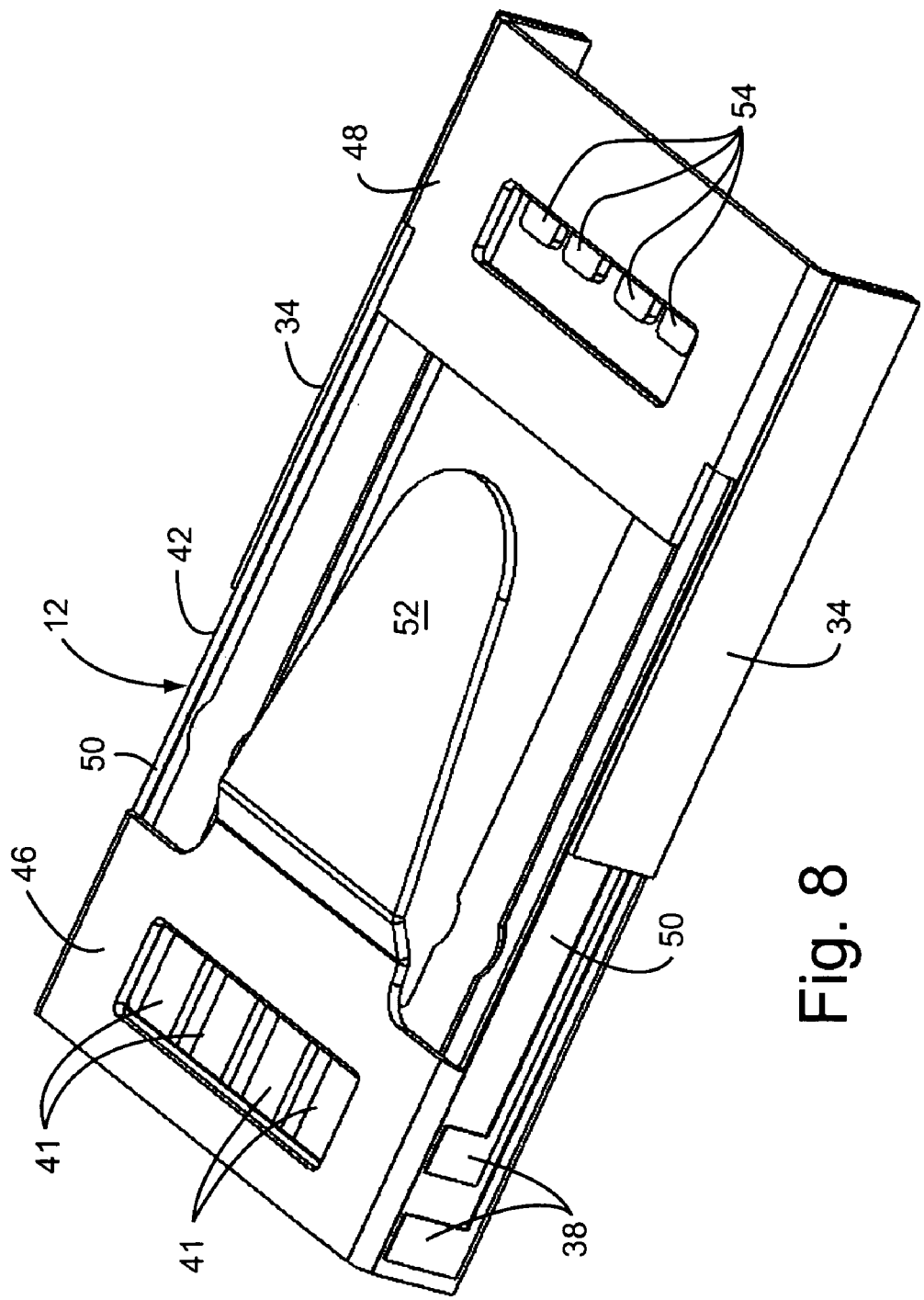
FIG. 8 is an isolated bottom perspective view of the PZT micro-actuator shown in FIG. 2 without the slider.

FIGS. 5-9 illustrate the precise positioning PZT micro-actuator 12 and slider 14 removed from the suspension 16. As illustrated, the PZT micro-actuator 12 includes a micro-actuator frame 42, e.g., made of stainless steel, and PZT elements 34 mounted to the micro-actuator frame 42. As best shown in FIGS. 7 and 8, the micro-actuator frame 42 includes a fixed portion 46, a movable portion 48, frame ribs 50 that interconnect the fixed and movable portions 46, 48, and a tongue 52 that extends from the fixed portion 46. The micro-actuator frame 42 may be constructed of any suitable material, e.g., metal, laminated material, and may be constructed using any suitable process, e.g., CIS, TSA, ILS or FSA technology.

Figure 10:
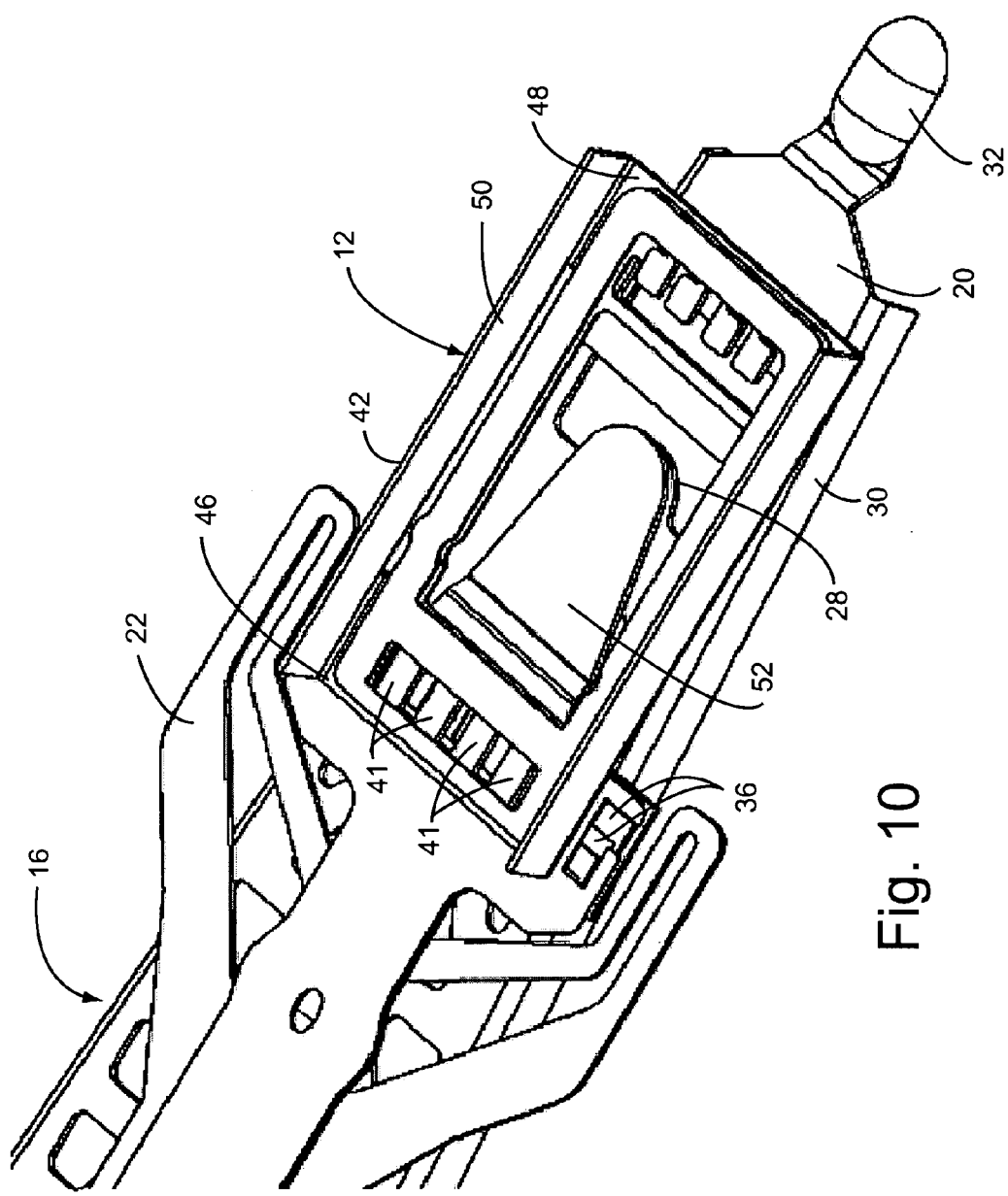
FIG. 10 is an enlarged, partial perspective view of the HGA shown in FIG. 2 with the slider removed from the PZT micro-actuator.

The fixed portion 46 is structured to connect the micro-actuator frame 42 to the suspension 16. Specifically, four suspension bonding pads 41, e.g., made of metal, are provided on the fixed portion 46. The suspension bonding pads 41 are bonded, e.g., by electric connection balls (USB (ultrasonic bonding) or ACF), with respective pads 40 provided on the suspension 16 (see FIG. 10). This connects the fixed portion 46 to the suspension 16 and electrically connects the micro-actuator frame 42 with the suspension trace 24.

Figure 9:
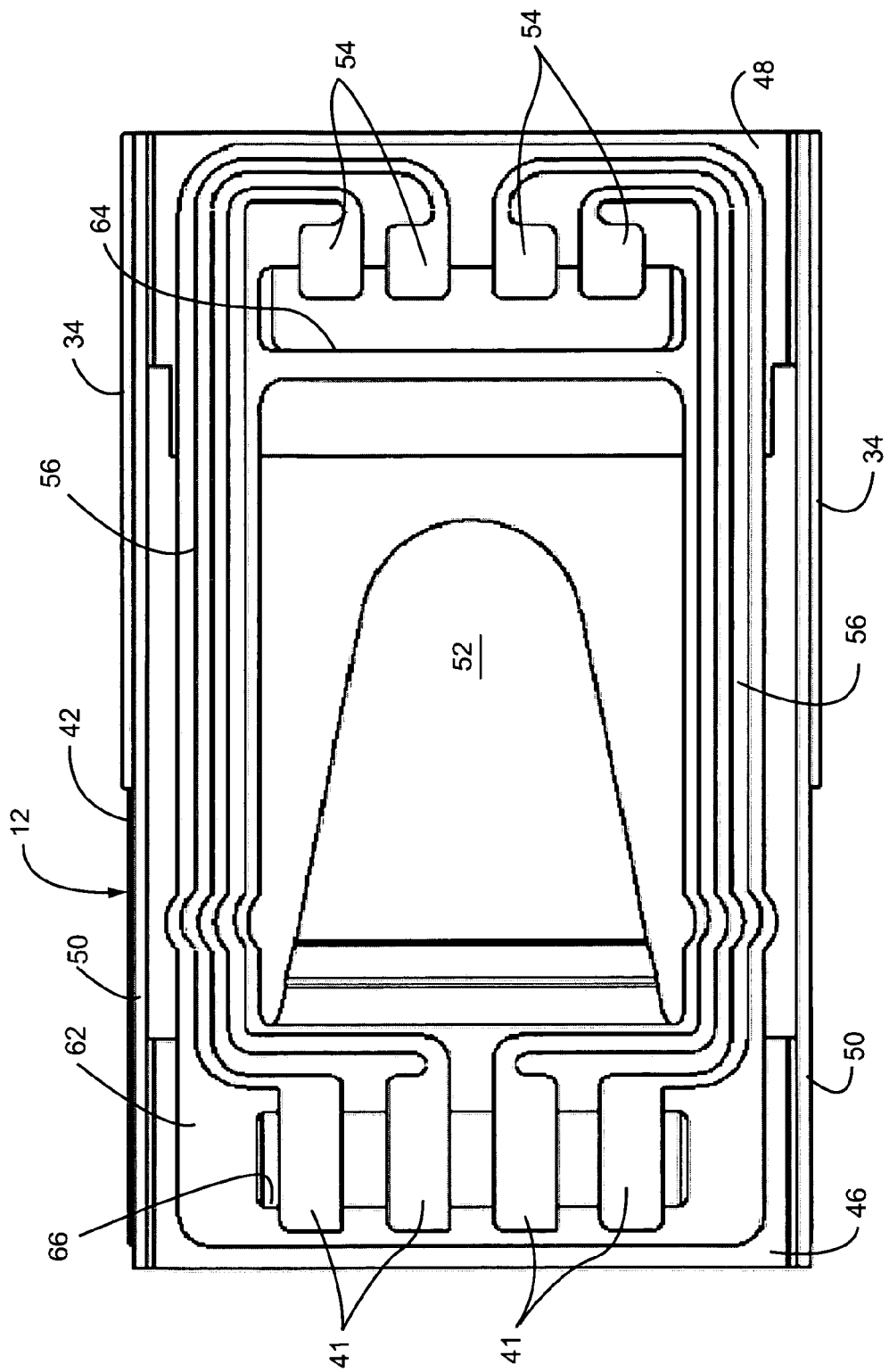
FIG. 9 is a top view of the PZT micro-actuator shown in FIG. 2 without the slider and a cover coat.

The movable portion 48 is structured to connect the micro-actuator frame 42 to the slider 14. Specifically, four slider bonding pads 54, e.g., made of metal plating gold, are provided on the movable portion 48. As shown in FIG. 9, the slider bonding pads 54 are electrically connected to the suspension bonding pads 41 through traces 56, e.g., made of metal. The slider 14 has four bonding pads 58 on an end thereof corresponding to the slider bonding pads 54 of the movable portion 48. The movable portion 48 supports the slider 14 thereon and the slider bonding pads 54 are electrically bonded with respective pads 58 provided on the slider 14 using, for example, electric connection balls (GBB or SBB) 60 (see FIG. 5). This connects the movable portion 48 to the slider 14 and electrically connects the slider 14 and its read/write elements to the suspension trace 24 on the suspension 16.

In the illustrated embodiment, the trace 56 includes four lines between the four slider bonding pads 54 and the four suspension bonding pads 41. However, any suitable number of pads and trace lines may be used. Also, the trace 56 detours around the slider 14 through insulators provided on the micro-actuator frame 42.

Specifically, as best shown in FIG. 9, a first insulator 62 is provided on the micro-actuator frame 42 and extends between the fixed and movable portions 46, 48. The first insulator 62 is constructed of a dielectric material, e.g., polyamide or polyimide. The trace 56 is provided on the first insulator 62 to prevent an electrical connection between the micro-actuator frame 42 and the trace 56. The first insulator 62 includes two holes 64, 66. One hole 64 is provided adjacent the slider bonding pads 54 to prevent engagement between the first insulator 62 and the connection ball 60. The other hole 66 is provided adjacent the suspension bonding pads 41 in order to expose the suspension bonding pads 41 for bonding with the suspension 16.

Figure 5:
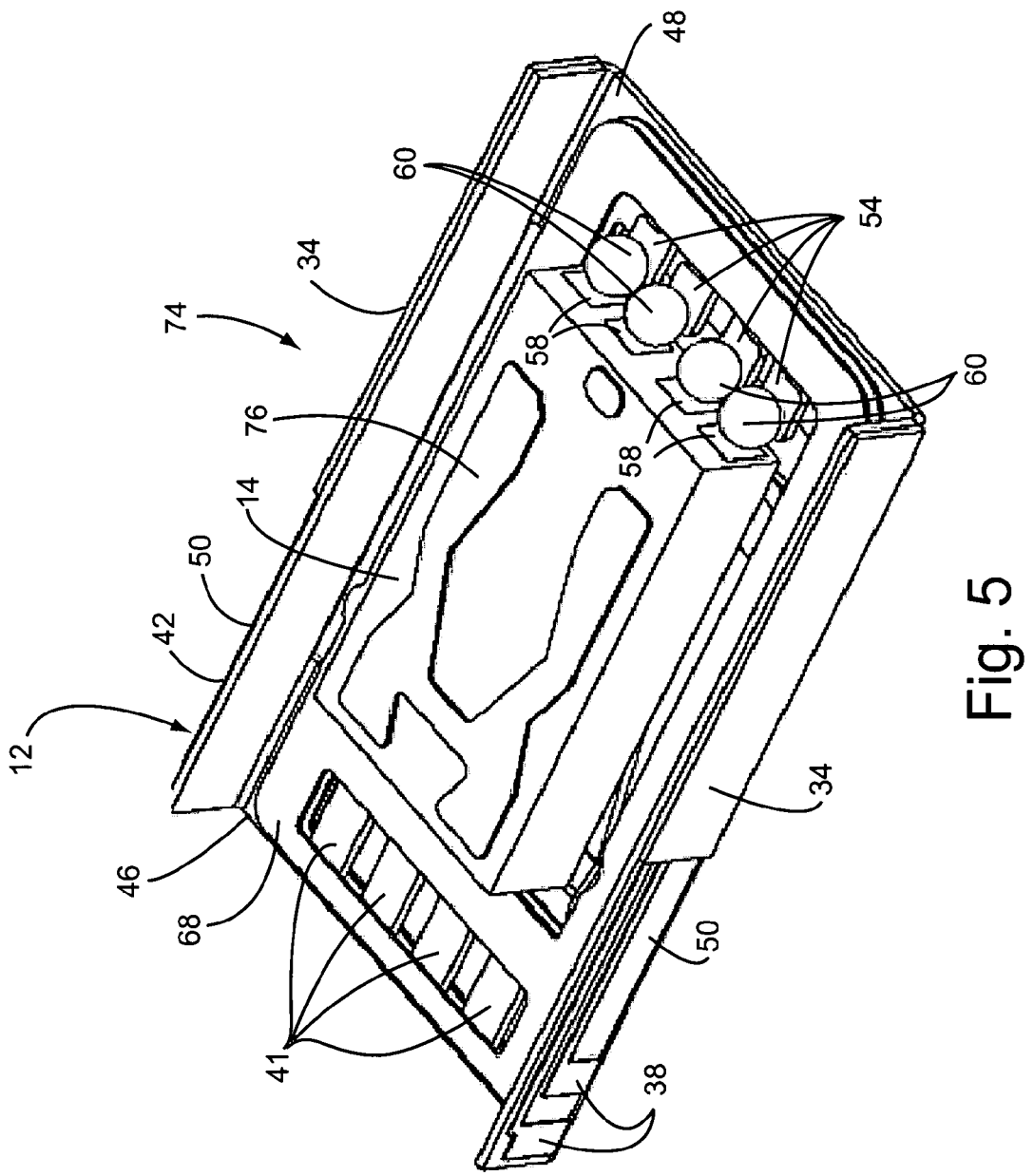
FIG. 5 is an isolated perspective view of the PZT micro-actuator with slider shown in FIG. 2.
Figure 6:
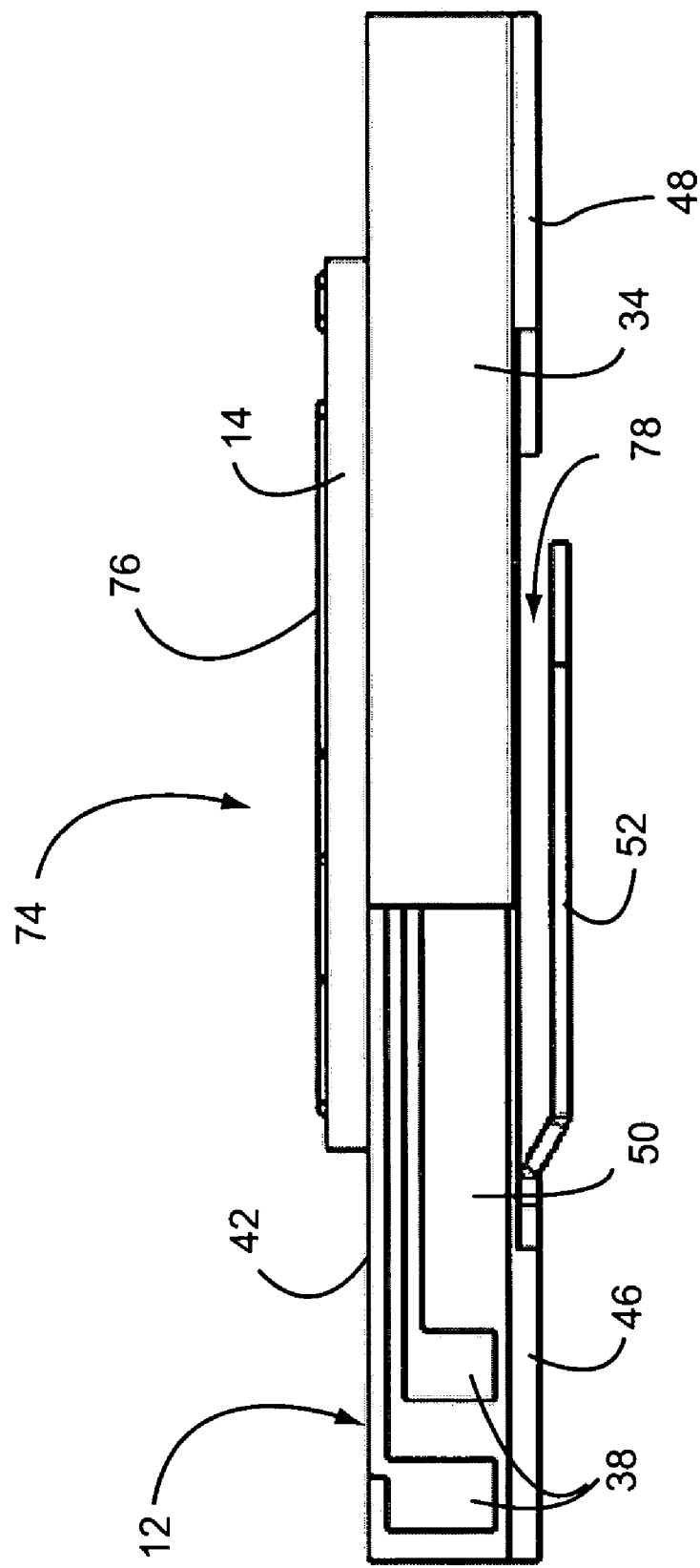
FIG. 6 is a partial side view of the PZT micro-actuator with slider shown in FIG. 5.

As best shown in FIGS. 5 and 7, a second insulator 68, also referred to as a cover coat, covers the trace 56 on the micro-actuator frame 42. The second insulator 68 is constructed of a dielectric material, e.g., polyamide, polyimide, or Alumina. Similar to the first insulator 62, the second insulator 68 includes a hole 70 adjacent the slider bonding pads 54 to prevent engagement between the second insulator 68 and the slider 14 and another hole 72 adjacent the suspension bonding pads 41 in order to expose the suspension bonding pads 41 for bonding with the suspension 16.

The frame ribs 50 interconnect the fixed and movable portions 46, 48. A PZT element 34 is mounted to each of the frame ribs 50 of the micro-actuator frame 42 to provide the PZT micro-actuator 12. Each PZT element 34 has a plate-like shape and is preferably formed by laminated thin films consisting of piezoelectric material such as PZT and Ni—Ag metal as electrode. However, one or more PZT elements 34 may be mounted to the frame ribs 50 in any suitable manner.

A slider 14 is mounted to the PZT micro-actuator 12 to provide a slider and PZT micro-actuator assembly 74. The slider 14 is mounted to the PZT micro-actuator 12 as shown in FIG. 5. As explained above, the slider 14, incorporating the read/write head, is electrically bonded to the slider bonding pads 54 of the micro-actuator frame 42 by four electrical connection balls (GBB or SBB) 60. As illustrated, each bonding ball 60 is disposed between the pad 58 of the slider 14 and the slider bonding pad 154 like a hemisphere.

The slider 14 is configured to read data and write data on a magnetic recording disk. The slider 14 is primarily constructed of ceramics and has an MR element as a reading element and an inductive element as a writing element made by using thin film technology. In the illustrated embodiment, the slider 14 has a rectangular shape. Also, the slider 14 has an air baring surface (ABS) 76 that is positioned opposite to the magnetic recording disk in use. The ABS 76 includes steps, rails, and/or pads that generate a flying force with air flux so that the slider 14 flies on the magnetic recording disk in use. However, the slider 14 may have other suitable structures and may be mounted to the PZT micro-actuator 12 in any suitable manner.

As shown in FIGS. 2, 3, 10, and 11, the slider and PZT micro-actuator assembly 74 is electrically connected to the suspension 16 of the HGA 10. As explained above, electrical connection balls (USB or ACF) are provided to electrically connect the pads 41 on the fixed portion 46 of the micro-actuator frame 42 to the pads 40 bonded to the suspension trace 24 provided on the suspension 16. Moreover, the electrical connection fixedly connects the fixed portion 46 to the suspension 16. In addition, the PZT elements 34 provided on the PZT micro-actuator 12 are electrically connected to the suspension trace 24. Specifically, pads 38, e.g., made of metal, are provided on the frame ribs 50 and coupled to the PZT elements 34 via traces. The pads 38 are electrically connected to the pads 36, e.g., using electrical connection balls (GBB or SBB), on the suspension 16 to electrically connect the PZT elements 34 with the suspension trace 24. This allows power to be applied via the suspension trace 24 to the PZT elements 34. However, the slider and PZT micro-actuator assembly 74 may be electrically connected to the suspension 16 in any other suitable manner.

Figure 12:
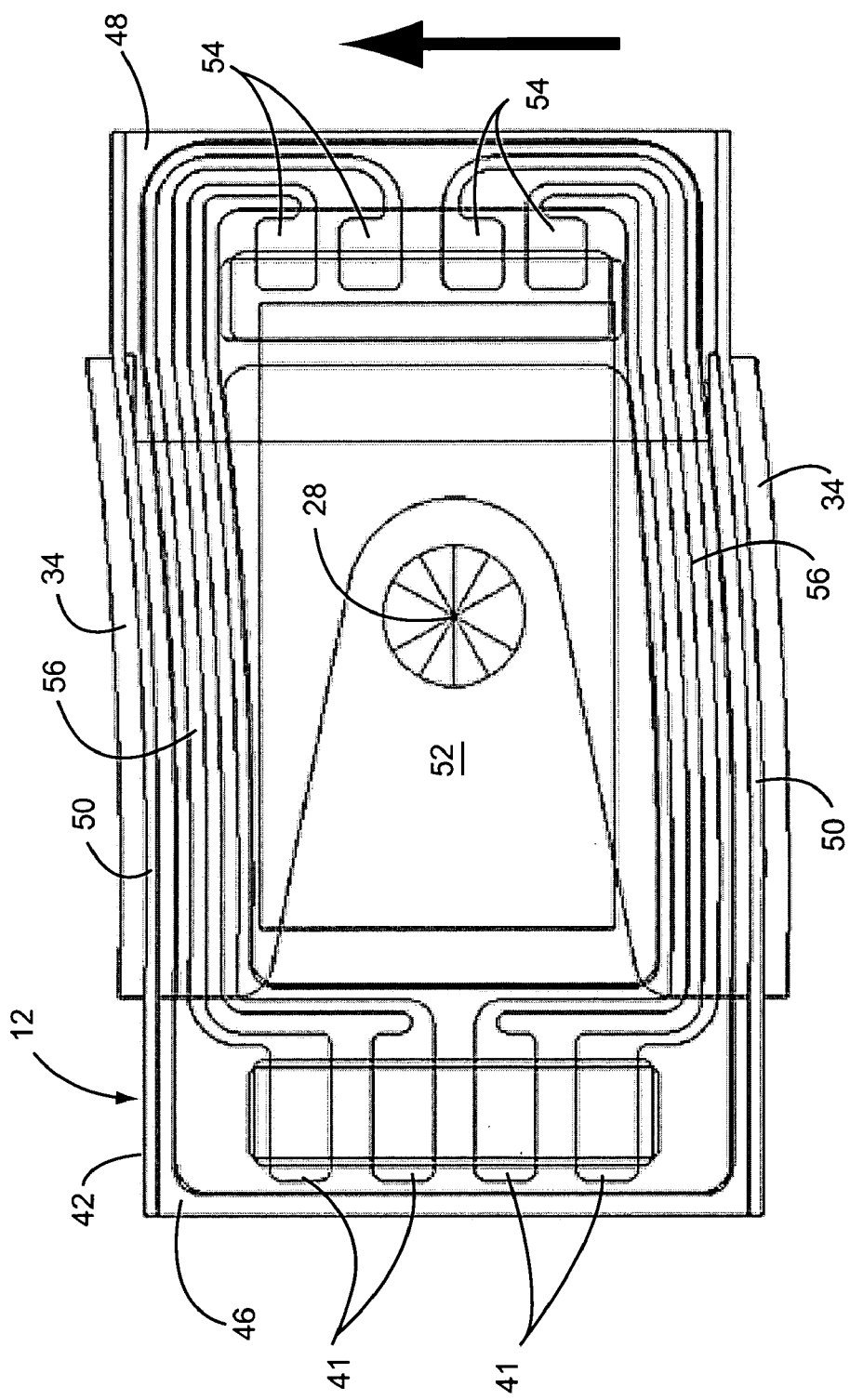
FIG. 12 is a top view of the PZT micro-actuator shown in FIG. 2 without the slider and a cover coat and in a mode where voltage is applied to the PZT elements.

In use, the PZT elements 34 are excited, e.g., by applying reverse phase alternative voltage thereto, to selectively cause expansion or contraction thereof. The PZT micro-actuator 12 is configured such that expansion or contraction of the PZT elements 34 cases movement of the frame ribs 50, which causes movement of the movable portion 48, which, in turn, causes movement of the slider 14 connected thereto. For example, as shown in FIG. 12, when the PZT elements 34 are excited, one PZT element 34 expands and the other PZT element 34 contracts. As a result, one frame rib 50 expands and the other frame rib 50 contracts, which moves the movable portion 48, which, in turn, moves the slider 14 in a direction across the track on the magnetic recording disk (e.g., see arrow). As illustrated, the movable portion 48 moves relative to the fixed portion 46, which remains stationary and fixed to the suspension 16.

Figure 11:
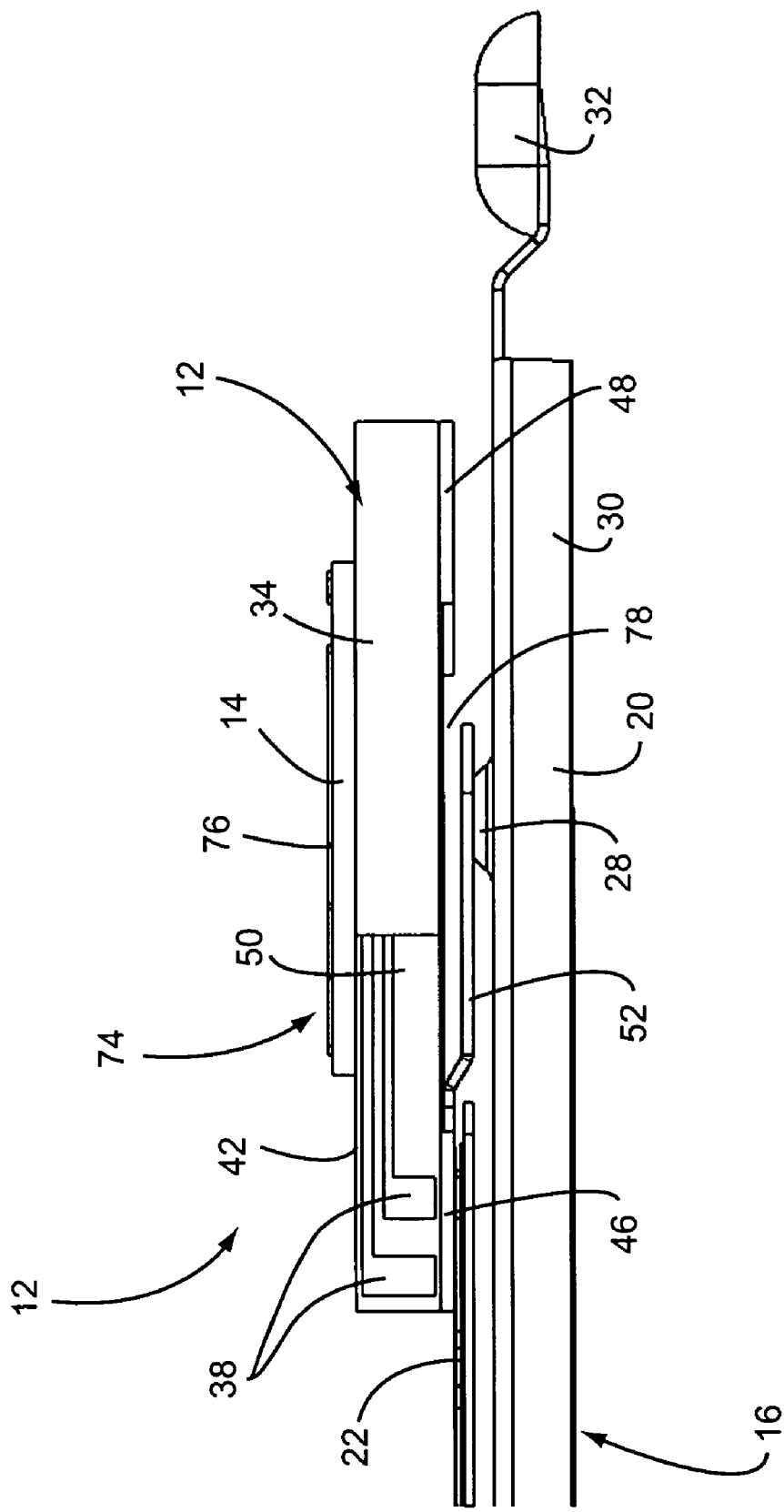
FIG. 11 is a partial side view of the HGA shown in FIG. 2.

Further, when the slider and PZT micro-actuator assembly 74 is connected to the suspension 16, the tongue 52 provided on the micro-actuator frame 42 engages (not bonded) the pivot 28 provided on the load beam 20 of the suspension 16 as best shown in FIG. 11. As noted above, the tongue 52, e.g., made of metal, extends from the fixed portion 46 of the micro-actuator frame 42. A gap 78 is provided between the tongue 52 and the movable portion 48/slider 14 so that the movable portion 48/slider 14 can move freely relative to the fixed portion 46 and the suspension 16.

Specifically, the tongue 52 is subject to forces from the pivot 28 of the suspension 16 in a direction towards the magnetic recording disk. The tongue 52 also is subject to flying forces from the slider 14, which it applies to the pivot 28 of the suspension 16. Thus, the tongue 52 is subject to forces both towards and away from the magnetic recording disk. Because the tongue 52 is fixed to the fixed portion 46 of the micro-actuator frame 42 and not to the movable portion 48 thereof, forces applied to the tongue 52 are not directly applied to the movable portion 48 and the slider 14 coupled thereto.

The head gimbal assembly 10 incorporating the slider and PZT micro-actuator assembly 74 has several advantages. For example, the PZT micro-actuator 12 includes the tongue 52 which is fixed only to the fixed portion 46 and not to the movable portion 48 in order to prevent resistance between the movable portion 48/slider 14 and itself (because the tongue 52 is engaged with the pivot 28 of the suspension 16). Additionally, the PZT micro-actuator 12 essentially point-supports force from the suspension 16 through the pivot 28 and allows two degrees of freedom of the slider in roll and pitch directions. Further, PZT micro-actuator 12 provides improved mechanical shock performance.

Figure 13:
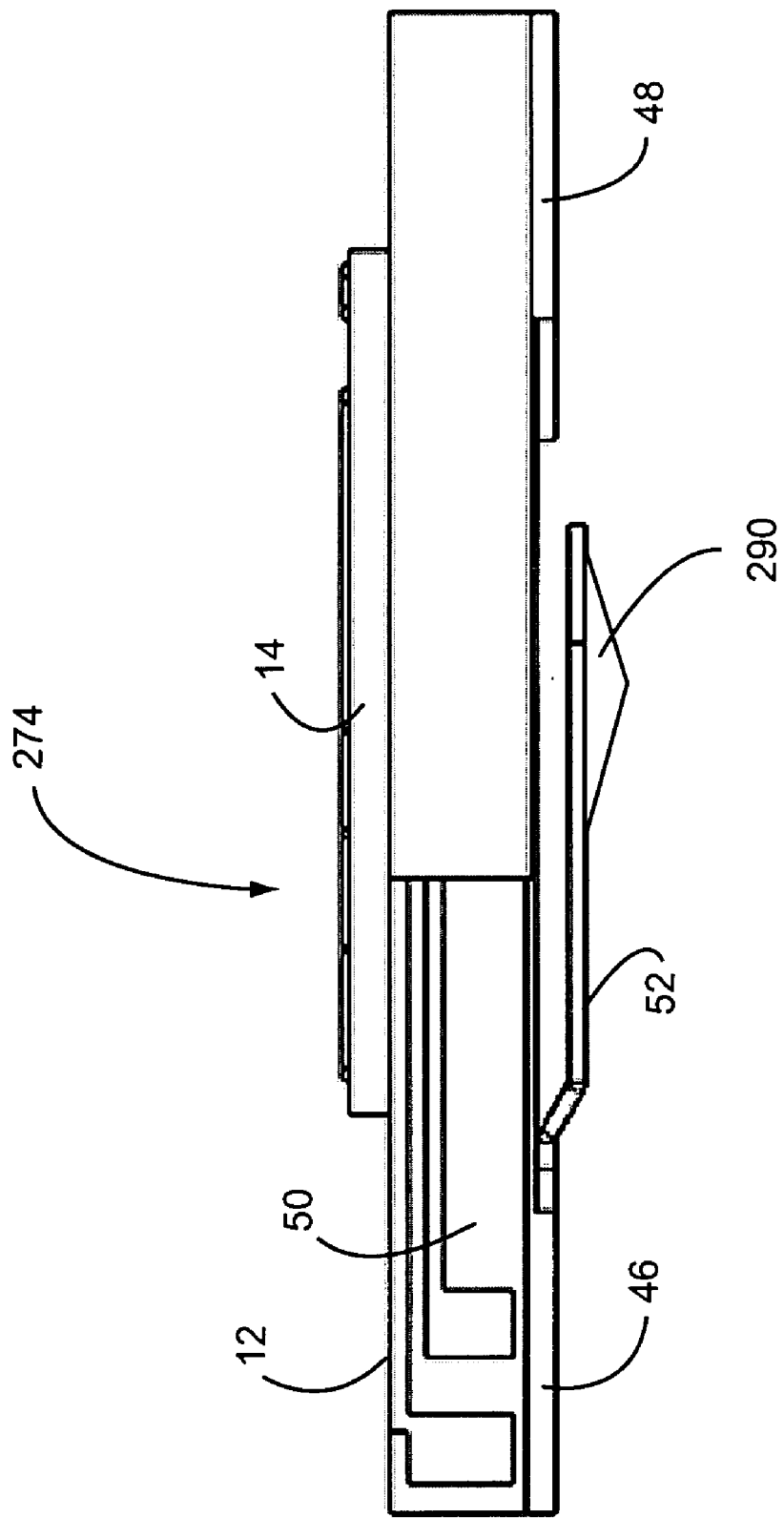
FIG. 13 is a partial side view of a PZT micro-actuator with slider according to another embodiment of the present invention.

FIG. 13 illustrates a slider and PZT micro-actuator 274 according to another exemplary embodiment of the present invention. In this embodiment, the tongue 52 of the PZT micro-actuator 12 includes a cone-shaped portion 290. The con-shaped portion 290 is configured and arranged to engage the pivot 28 of the suspension 16 when the slider and PZT micro-actuator 274 is mounted to the suspension 16. The remaining components of the slider and PZT micro-actuator 274 are substantially similar to the slider and PZT micro-actuator 74 and indicated with similar reference numerals.

Figure 14:
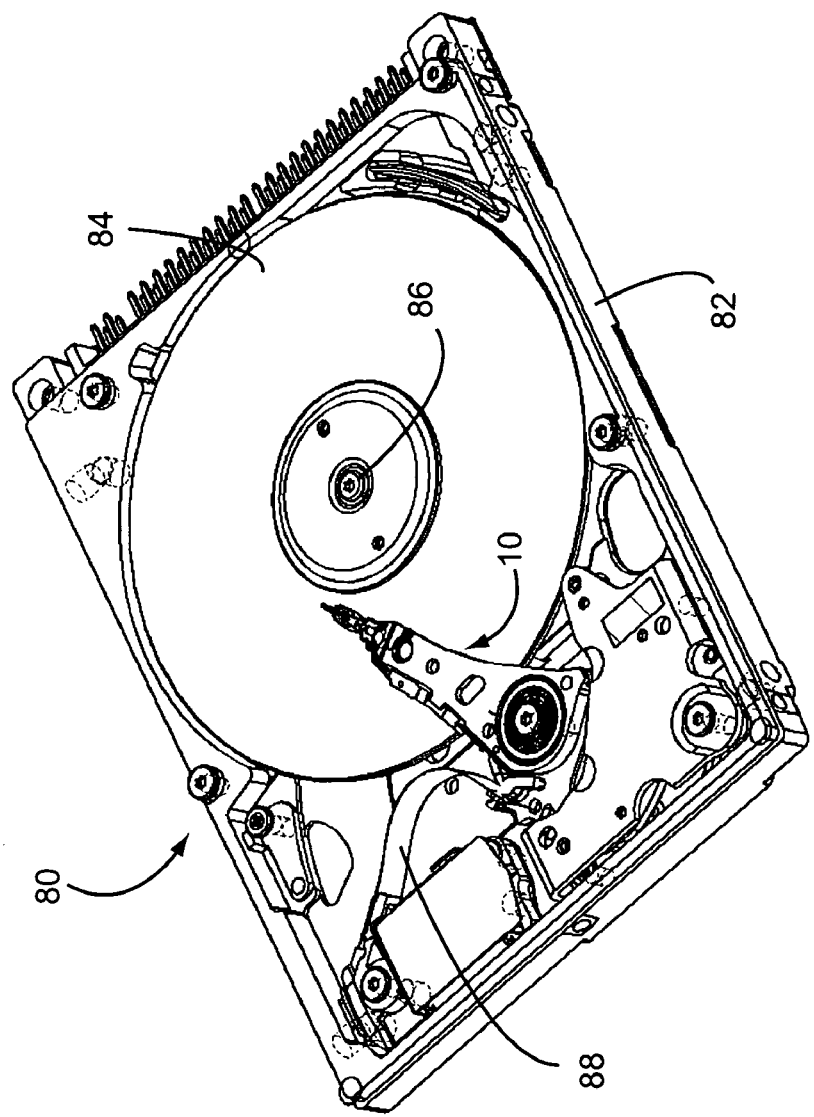
FIG. 14 is a perspective view of an exemplary disk drive device incorporating a HGA including a PZT micro-actuator according to an embodiment of the present invention.

FIG. 14 shows an exemplary disk drive device (HDD) 80 with a head gimbal assembly 10 incorporating a PZT micro-actuator 12 according to embodiments of the present invention. The HDD 80 includes a housing 82, a disk 84, a spindle motor 86, a flex printed circuit 88, a VCM and an HGA 10 constructed in accordance with embodiments of the present invention. Because the structure, operation and assembly processes of disk drive devices are well known to persons of ordinary skill in the art, further details regarding the disk drive device are not provided herein so as not to obscure the invention. The PZT micro-actuator 12 can be implemented in any suitable disk drive device having a micro-actuator or any other device with a micro-actuator.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A micro-actuator for a head gimbal assembly, comprising:
    a fixed portion connectable to a suspension of the head gimbal assembly;
    a movable portion connectable to a slider of the head gimbal assembly;
    a pair of frame ribs that interconnect the fixed portion and the movable portion;
    a PZT element mounted to each of the frame ribs, each PZT element being excitable to cause selective movement of the frame ribs which causes movement of the movable portion to cause movement of the slider; and a tongue fixed to and extending from the fixed portion, the tongue engagable with a pivot provided on the suspension of the head gimbal assembly, wherein the tongue forms a gap between the movable portion and itself.

2. The micro-actuator according to claim 1, wherein suspension bonding pads are provided on the fixed portion that are electrically bonded with respective pads provided on the suspension.

3. The micro-actuator according to claim 2, wherein slider bonding pads are provided on the movable portion that are electrically bonded with respective pads provided on the slider.

4. The micro-actuator according to claim 3, wherein the suspension bonding pads are electrically connected to the slider bonding pads through traces.

5. The micro-actuator according to claim 4, wherein the suspension bonding pads, the slider bonding pads, and the traces are supported by insulators.

6. The micro-actuator according to claim 1, wherein the tongue includes a cone-shaped portion engagable with the pivot provided on the suspension.

7. The micro-actuator according to claim 1, wherein the tongue spreads over a center of the slider and has a supporting point that is a center of movement of the slider.

8. A head gimbal assembly comprising:
a micro-actuator;
a slider; and
a suspension that supports the micro-actuator and slider,
wherein the micro-actuator includes:
  a fixed portion connected to the suspension;
  a movable portion connected to the slider;
  a pair of frame ribs that interconnect the fixed portion and the movable portion;
  a PZT element mounted to each of the frame ribs, each PZT element being excitable to cause selective movement of the frame ribs which causes movement of the movable portion to cause movement of the slider; and
  a tongue fixed to and extending from the fixed portion, the tongue engaged with a pivot provided on the suspension,
  wherein the tongue forms a gap between the movable portion and itself.

9. The head gimbal assembly according to claim 8, wherein the slider includes a read/write element for magnetic recording.

10. The head gimbal assembly according to claim 8, wherein the fixed portion is connected to a flexure of the suspension.

11. The head gimbal assembly according to claim 8, wherein the pivot is provided on a load beam of the suspension.

12. The head gimbal assembly according to claim 8, wherein suspension bonding pads are provided on the fixed portion that are electrically bonded with respective pads provided on the suspension.

13. The head gimbal assembly according to claim 12, wherein slider bonding pads are provided on the movable portion that are electrically bonded with respective pads provided on the slider.

14. The head gimbal assembly according to claim 13, wherein the suspension bonding pads are electrically connected to the slider bonding pads through traces.

15. The head gimbal assembly according to claim 14, wherein the suspension bonding pads, the slider bonding pads, and the traces are supported by insulators.

16. The head gimbal assembly according to claim 8, wherein the tongue includes a cone-shaped portion engagable with the pivot provided on the suspension.

17. The head gimbal assembly according to claim 8, wherein the tongue spreads over a center of the slider and has a supporting point that is a center of movement of the slider.

18. A disk drive device comprising:
a head gimbal assembly including a micro-actuator, a slider, and a suspension that supports the micro-actuator and slider;
a drive arm connected to the head gimbal assembly;
a disk; and
a spindle motor operable to spin the disk,
wherein the micro-actuator includes:
  a fixed portion connected to the suspension;
  a movable portion connected to the slider;
  a pair of frame ribs that interconnect the fixed portion and the movable portion;
  a PZT element mounted to each of the frame ribs, each PZT element being excitable to cause selective movement of the frame ribs which causes movement of the movable portion to cause movement of the slider; and
  a tongue fixed to and extending from the fixed portion, the tongue engaged with a pivot provided on the suspension,
  wherein the tongue forms a gap between the movable portion and itself.

* * * * *